(No Model.) 6 Sheets—Sheet 3.

F. H. STEELOW.
RIVETING MACHINE.

No. 484,473. Patented Oct. 18, 1892.

Witnesses.
P. W. Harbison.
F. M. Townsend.

Inventor.
Fred. H. Steelow.
By Hazard & Townsend
his attys.

(No Model.)  6 Sheets—Sheet 4.

F. H. STEELOW.
RIVETING MACHINE.

No. 484,473. Patented Oct. 18, 1892.

Fig. 10.

Witnesses.
P. W. Harbeson.
F. W. Townsend.

Inventor.
Fred. H. Steelow.
By Hagart & Townsend.
his Atty.

UNITED STATES PATENT OFFICE.

FREDERICK H. STEELOW, OF LOS ANGELES, CALIFORNIA.

RIVETING-MACHINE.

SPECIFICATION forming part of Letters Patent No. 484,473, dated October 18, 1892.

Application filed October 10, 1891. Serial No. 408,361. (No model.)

*To all whom it may concern:*

Be it known that I, FREDERICK H. STEELOW, a citizen of the United States, residing at Los Angeles, in the county of Los Angeles and State of California, have invented a new and useful Riveting-Machine, of which the following is a specification.

The primary object of my invention is to produce a machine which will rivet sheet metal practically water-tight, pressing the entire lap into perfect contact, and preventing all objectionable blistering, buckling, or swaging of the metal.

A further object is to provide a machine which will produce such riveted pipe with great rapidity.

My invention primarily comprises the combination of a riveting-die plate provided with a series of rivet-setting dies consisting of a centering and stoving die, a spreading-die, and a buttoning or heading die arranged in the order named in line with each other, and means for operating such die-plate to cause the several dies of the series to operate successively upon a series of rivets to stove, flatten, and head them in turn.

My invention also comprises a die-plate provided with a series of dies, each of which is provided with a cavity large enough to completely chamber the rivet such die has acted upon, and each cavity being large enough to chamber the completed rivet-head, so that the machine can be operated in either direction along the line of rivets without interfering with the rivets, and at each stroke will press the sheets together.

It also comprises a die-plate provided with a series of five riveting-dies, the middle one of which is a heading-die, the next one on each side thereof a spreading-die, and those at the ends of the line stoving-dies, each provided with a cavity large enough to completely chamber the rivet such die has acted upon and each cavity being large enough to chamber the head of the completed rivet, whereby the die-plate is adapted to operate in either direction along the line of rivets and to press the sheets together each time a rivet is acted upon.

It also comprises a die-plate provided with two series of five rivet sets or dies, as above specified, arranged in parallel lines and in alternating positions, whereby the die-plate is adapted to operate in either direction to set a double line of rivets, at the same time pressing the sheets together as each rivet is acted upon.

It also comprises the combination, with a vertically-reciprocating riveting-die plate having the rivet-setting dies, of a riveting-mandrel provided in its upper face with a series of rivet-base-chambering cavities arranged to receive the bases of the rivets when the work is on the mandrel, thus to center the work, so that the pressure-head will operate with accuracy to center its rivet-setting dies upon the rivets, also to enable the die-plate to effectually press the sheets together.

It also comprises the combination of a mandrel provided with two rows of rivet-base-seating cavities and having its pressure-face curved to conform to the curve of the interior of the tube to be riveted, with or without the pressure-relieving space hereinafter set forth, and a reciprocating die-plate provided with the rivet-chambering cavities and having its pressure-face curved to conform to the curvature of the exterior of the tube.

My invention also comprises a rivet-stoving set or die having its rivet-engaging end provided with a rivet-stem-receiving cavity shorter than the protruding stem of the rivet to be riveted and deeper than the finished head of the rivet, cylindrical at its base and converging at its top, whereby the rivet when being stove is centered or brought into line with the direction of the movement of the die, thus to prevent bending the rivet.

My invention also comprises the combination of the die-plate, suitable mechanism for reciprocating the die-plate vertically, and means for advancing it horizontally when in its elevated position.

It also embraces other combinations and features of construction hereinafter set forth.

The accompanying drawings illustrate my invention.

Fig. 7 is a plan view of the mandrel swung out to allow the introduction of the pipe to be riveted.

Figure 1:
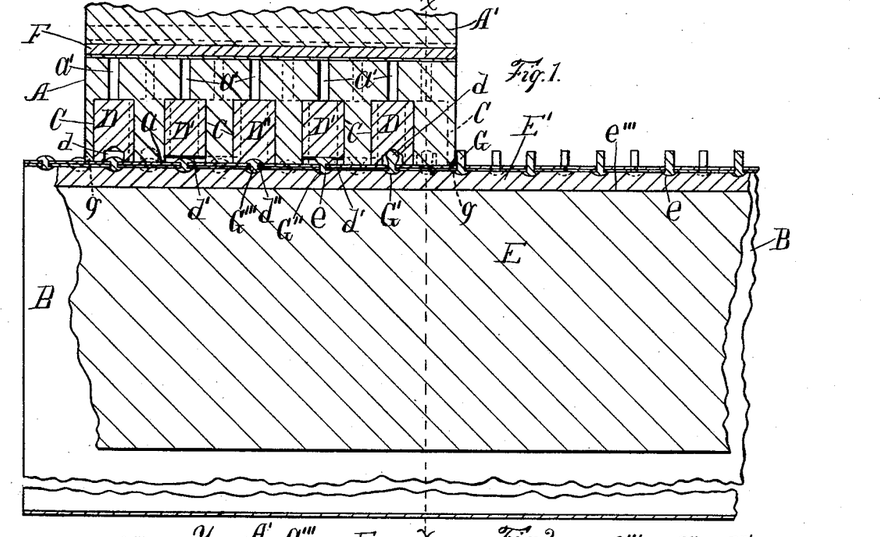
Figure 1 is a vertical longitudinal section of the die-plate and the lower portion of the plunger which operates it, a fragment of the riveting-mandrel, and a fragment of pipe with rivets, showing the work in the different stages of progress and completion, the plunger and die-plate being in their depressed or operating position. Line $y\ y$, Fig. 2, indicates the line of section.
Figures 2, 3, 4:
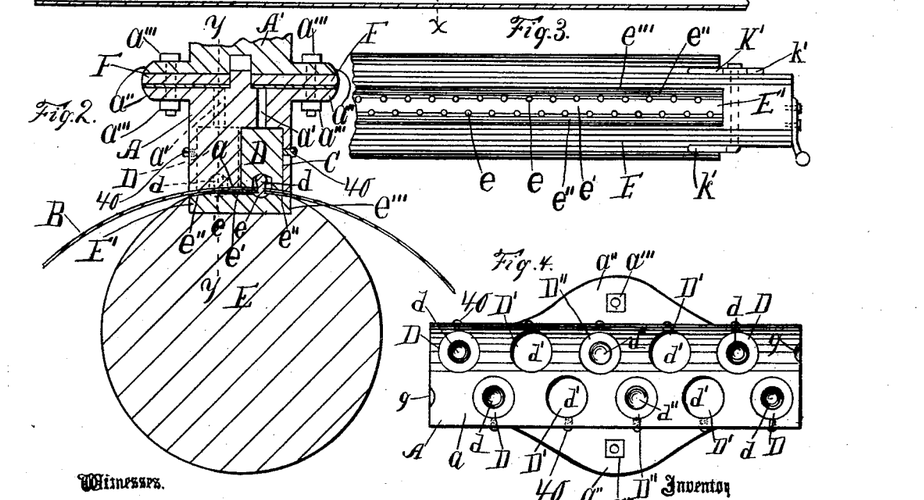
Fig. 2 is a vertical mid-section of the die-plate and fragments of the plunger, the mandrel, and the pipe on line $x\ x$, Fig. 1.
Fig. 3 is a top view of the free or swinging end of the mandrel.
Fig. 4 is a view of the under or pressure face of the die-plate.

A is the die plate or block of the press-head, and its contact or pressure face $a$ is curved to conform to the exterior of the pipe B to be riveted and is provided with a series of die-seats C, in which are seated the end stoving-dies D D, the middle heading-die D′′′, and the intermediate spreading-dies D′ D′. In a practical pipe-machine it is sometimes necessary to have two rows of dies, as shown in the drawings, to rivet two rows of rivets; but it will be understood that the machine may be changed to rivet a single row of rivets by substituting a single-row die-plate and mandrel-plate for those shown. The dies are removable and holes $a'$ are provided in the die-plate A to allow the insertion of a punch to drive the dies out of their seats.

The stoving-dies D are provided with the rivet-centering cavity $d$ to center the rivet before it is stoved, and the body of the rivet is thereby formed directly over its base.

The spreading-dies D′ D′ are provided on their under side with a flat smooth rivet-spreading face $d'$, which will flatten and spread the rivet after it has been stoved by the die D. The heading-die has the heading-cavity $d''$.

The mandrel E is provided with the rivet-base-seating cavities $e$.

E′ is the face-plate of the mandrel proper, seated in a channel $e'''$, cut in the face of the mandrel proper to chamber such face-plate. The cavities, as shown, are formed in the face-plate of the mandrel, which face-plate is preferably made of tool-steel to give strength and durability to the walls of such cavities. By providing a number of plates having variously-arranged cavities the same mandrel may be used on different classes and sizes of work, the die-plate being changed correspondingly.

The upper or pressure face of the mandrel E or mandrel-plate E′ is curved to conform to the curvature of the interior of the tube to be riveted, and the under or pressure face of the die-plate is curved to conform to the curvature of the exterior of such tube, so that the lap is firmly pressed at each stroke of the die-plate.

In order to relieve the strain which is liable to occur by reason of inequalities in the metal, I prefer to flatten the mandrel or mandrel-plate to form the pressure-relieving space $e''$ between the center lines of the two rows of rivet-base-seating cavities $e$. This is shown in the drawings, the curvature of the mandrel appearing only on the outer sides of such rows of cavities, there to conform for a short distance to the curvature of the tube to be riveted. $e''\ e''$ indicate the curved faces on each side of the center lines of such rows of cavities.

The die-plate A is removably secured to the plunger A′ of the press-head by suitable flanges $a''$ and bolts and nuts $a'''$, whereby provision is made for adjusting the machine for riveting plates of various thickness.

F represents packing-plates inserted between the die-plate and the plunger to adjust it for riveting different thickness of metal.

In practice the rivets G are inserted in their holes in the joints of pipe and then the joint is placed on the mandrel with the faces of the rivets in the cavities $e$. Then beginning at one end the die-plate is reciprocated vertically, and when elevated clear of the rivets is advanced between each stroke, so that a rivet is successively received into the stoving-die and there stoved, then into the spreading-die and there flattened, and then into the heading-die and there formed into a head, after which it cannot be acted upon by any of the dies, because it will be chambered by them. At each stroke the die-plate engages the laps of the sheet forming the tube and presses them firmly together between itself and the curved faces $e''\ e''$. This springs that portion of the tube intermediate the curved faces into the proper curved shape, while the slight cavity between the flat middle face $e'$ and the curved material of the pipe gives sufficient room for relief of undue pressure caused by inequalities of the sheet. In this process of riveting the plates are pressed together at the moment in each stroke that the greatest pressure is applied to the rivet, and thus absolutely prevents buckling or blistering or looseness of joint. In order that the lap may be tightly pressed together before the rivet is stoved, the die-plate extends forward beyond the stoving-die far enough to just escape the next unstoved rivet, and rivet-head-receiving notches $g$ are provided to chamber a portion of the rivet-heads when formed, so that the die-plate will not strike them.

The device illustrated in Figs. 1, 2, 3, and 4 may be employed in riveting-machines of various forms of construction, and the remaining figures illustrate the machine which I at present consider preferable for the operation of said device. The mandrel E is pivoted at one end to one of the supports to swing forward horizontally to allow the pipe to be placed upon and removed therefrom and allow the free end to be supported while the rivets are being set.

H is the hinge-bolt, which passes through the mandrel a foot (more or less) from the bearing end thereof and pivots it to one of the mandrel-supports.

I is the lower bearing-face, and J the depression-bracket, preferably made of tool-steel and arranged to engage the upper face of the end of the mandrel to hold the pivoted end of the mandrel down, thus supporting the mandrel when it is swung out, as shown in Fig. 7. Tool-steel plates $i$ are arranged on the mandrel-supports L L to prevent wear. It is necessary that the parts fit exactly, so that the pressure will be exact.

Figure 12:
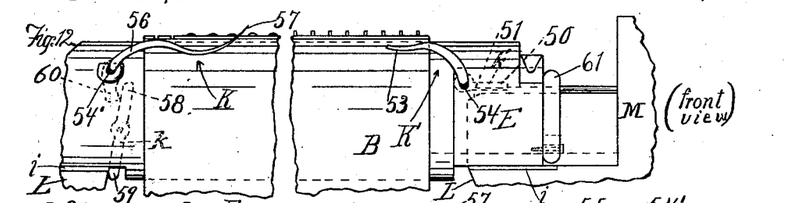
Fig. 12 is a fragmentary front elevation showing the mandrel closed and the work-clamping device closed to clamp the work upon the mandrel. The work is shown with rivets in place and partially riveted.

K K' are spring-clamps arranged to hold the pipe in position upon the mandrel. They are provided, respectively, with levers $k$ $k'$, which respectively engage the supports L when the mandrel is thrown into its closed position, as shown in Figs 9, 11, 12, 13, and 15, and are thus caused to press the spring-clamps firmly down toward the mandrel and upon the material thereupon when the mandrel is closed, thus preventing the displacement of the tube. In Fig. 12 and succeeding figures the levers $k$ $k'$ are shown on a larger scale than in the other views, and their parts are definitely indicated by numerals, as hereinafter specified, while the reference-letters $k$ $k'$ refer indefinitely to the entire levers, respectively. The clamps are made of spring-steel to allow them to yield slightly in case a rivet in the middle of the pipe should fit a hole too tightly to fully enter it until pressed by the die-plate, as sometimes occurs, so that until the die-plate presses the rivet into place the pipe may tilt slightly when pressed near the end by the die-plate. The spring-clamp will yield to the pressure, and this avoids breakages.

36 represents a hook to hold the mandrel in place when closed.

L L are the mandrel-supports, forming part of the frame-standards M M, to which is fixed the riveting-head-slide cross-beam N, depending from the base of which is the sliding riveting-head comprising the head-frame O, the eccentric-box P, the eccentric Q, the plunger A', and the die-plate A.

Figures 4, 5, 6:
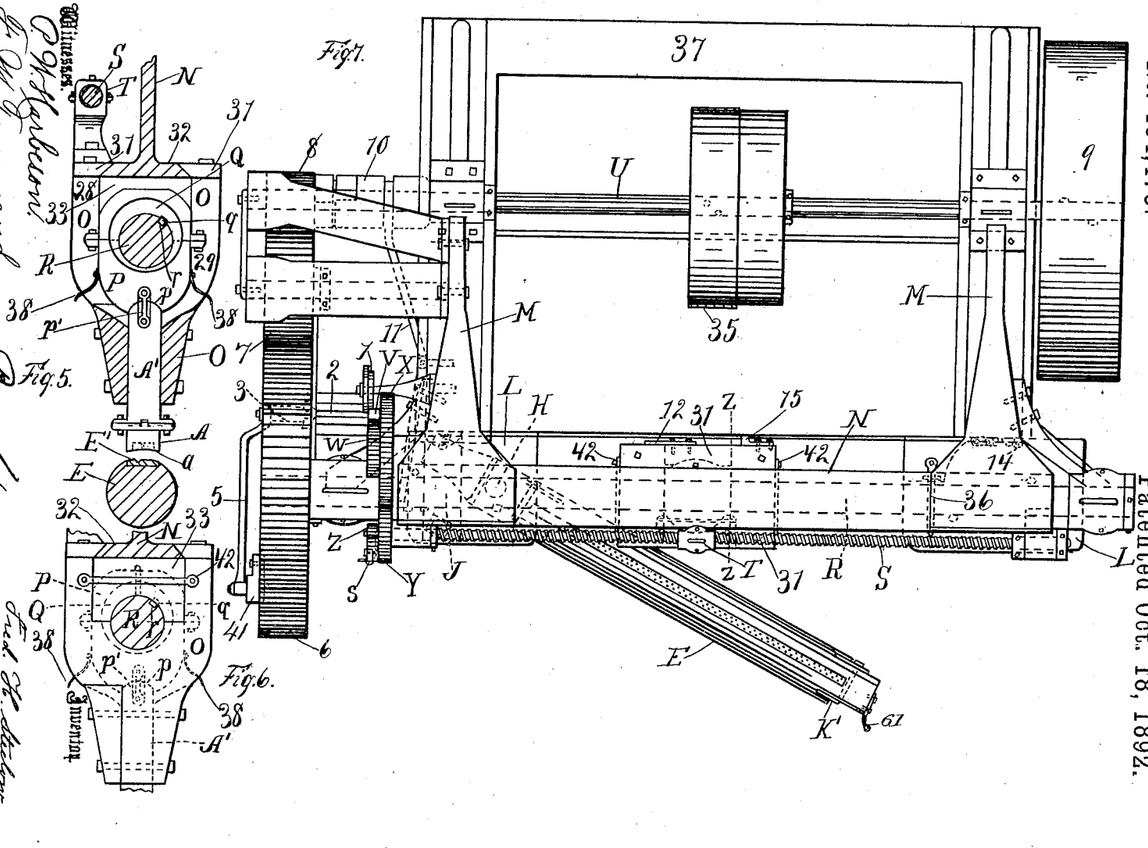
Fig. 5 is a view showing the die-plate and plunger elevated together, with a view of a portion of the operating mechanism, partly in section, on line $z\ z$, Fig. 7, and the mandrel in cross-section.
Fig. 6 is a view of the upper portion of the traveling press-head, the shaft R, and a fragment of the beam which supports the head.

R is the rotating eccentric-driving shaft, upon which the eccentric is mounted to slide along and to rotate therewith. A spline $q$ projects from the eccentric into a channel $r$ in the eccentric-driving shaft R to cause the eccentric to rotate with the shaft while slipping freely therealong. The eccentric is journaled in the eccentric-box P, the sides of which are flush with the sides of the eccentric and which, together with the eccentric, fit closely against the thrust-blocks 33 33, which are fitted to the under face of the beam N to slide therealong and are journaled upon the eccentric-driving shaft R, thus forming a solid connection between the shaft and the beam N to hold the shaft in position against the thrust of the eccentric when the riveting-stroke is being made. The sides of the eccentric and its box fit the inner faces of the thrust-blocks exactly, so that the shaft will withstand any strain except that required to shear it. The spaces 28 29, front and back, at the top of the head-frame allow the eccentric-box to be moved freely by the eccentric. The plunger A' is guided by the head-frame and allowed no movement except vertical longitudinal reciprocation, and it is connected with the eccentric-box P by a knuckle-joint $p$, which allows the block to vibrate. The tie-rods $p'$ are pivoted to the box and plunger and hold them together, so that when the box rises it lifts the plunger.

The head-frame O is movably mounted upon the slide-beam. It is supported by the guide-plates 31, which are fitted on the base-flanges 32 of the beam N in such a manner as to support the head-frame and allow it to slide to and fro across the machine.

Figure 10:
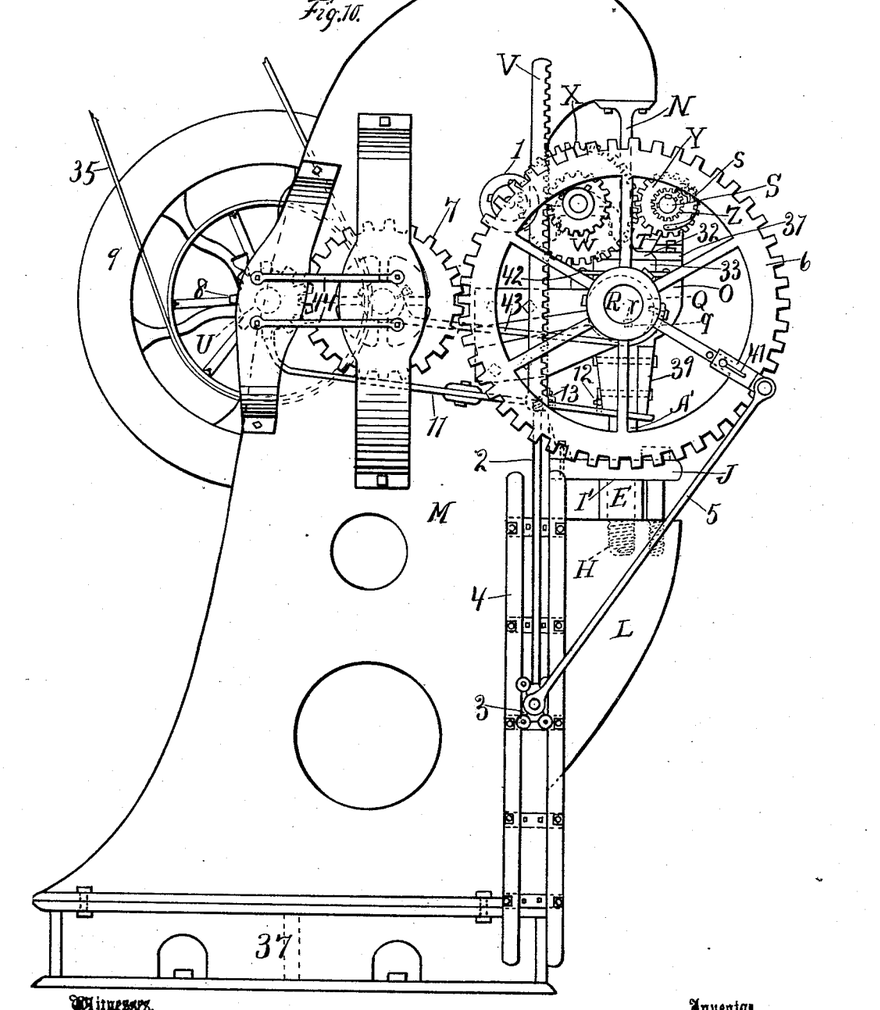
Fig. 10 is an elevation of the side on which is the transmission and feed mechanism.
Figure 11:
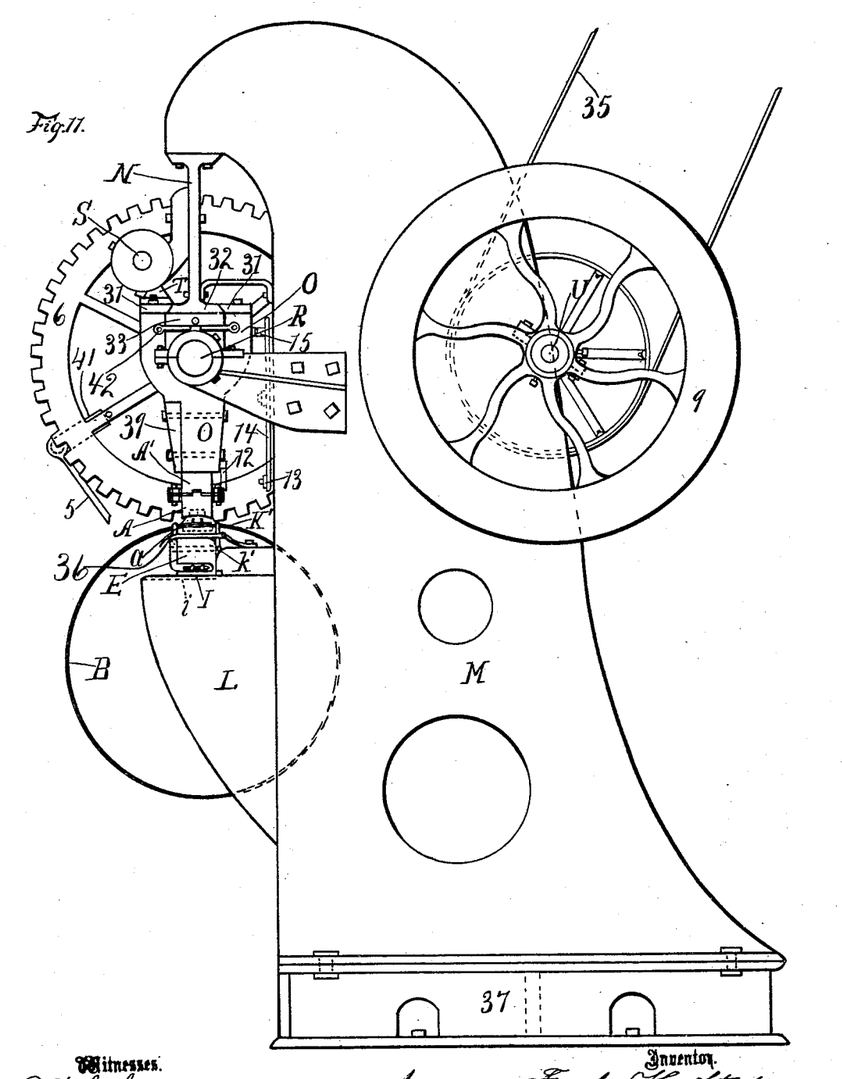
Fig. 11 is an elevation of the other side of the machine with a pipe in place. Parts of the feed mechanism are omitted from this view.

The riveting-head frame is connected with the screw-shaft S by the female screw-traveler T. The screw-shaft and eccentric-driving shaft are rotated by power transmitted from the power-shaft U through suitable transmitting mechanism and connected by such mechanism to rotate with relation to each other. The screw-shaft is provided with suitable reversing pawl-feed mechanisms, whereby the screw is caused to rotate in either direction, thus to carry the riveting-head back and forth across the machine at the will of the operator. The screw is rotated intermittently by means of the reciprocating rack V and intermediate transmitting and feed mechanism comprising the train of cogs W X Y Z and the reversible pawl $s$. Such transmitting and feed mechanism is made on a well-known principle and does not need particular description.

1 is the antifriction-wheel to hold the rack in engagement with the wheel W to drive such train.

2 is a connecting-rod connecting the rack with the guide-carriage 3, which runs in guideways 4 and is driven by pitman 5, adjustably secured to the eccentric-driving spur-wheel 6, which is connected by intermediate means 7 and 8 with the driving-shaft U.

9 is a fly-wheel upon shaft U.

10 is a clutch for throwing the shaft into and out of gear with the pinion 8, which drives the mechanism. This clutch is operated by the clutch-lever 11, the front end of which projects into the path of the arm 12, which is fixed in the riveting-head, so that when the riveting-head has moved to the left side of the machine the arm will operate the lever to throw the machine out of gear and stop the head to prevent it from striking the frame. The rod 13 and lever 14 operate the lever 11 in like manner when the upper end of the lever 14 is struck by the arm 15 projecting from the back of the head.

The clutch-lever 11 is flat horizontally and made of spring-steel, so that when it is desired to throw the clutch into gear again to start the head on its return movement the clutch-lever may be sprung down below the lever-operating arm which has operated it to throw the clutch out of gear, and thus permit the operator of the machine to throw the lever by hand.

34 represents a spring arranged to hold the lever in position to keep the clutch normally in gear.

It is to be understood that the machine is accurately set, so that the dies are vertically centered with the cavities in the mandrel. This is easily accomplished by throwing the pawl s of the screw-shaft out of gear and then rotating the screw-shaft to move the head to the desired position.

Figure 8:
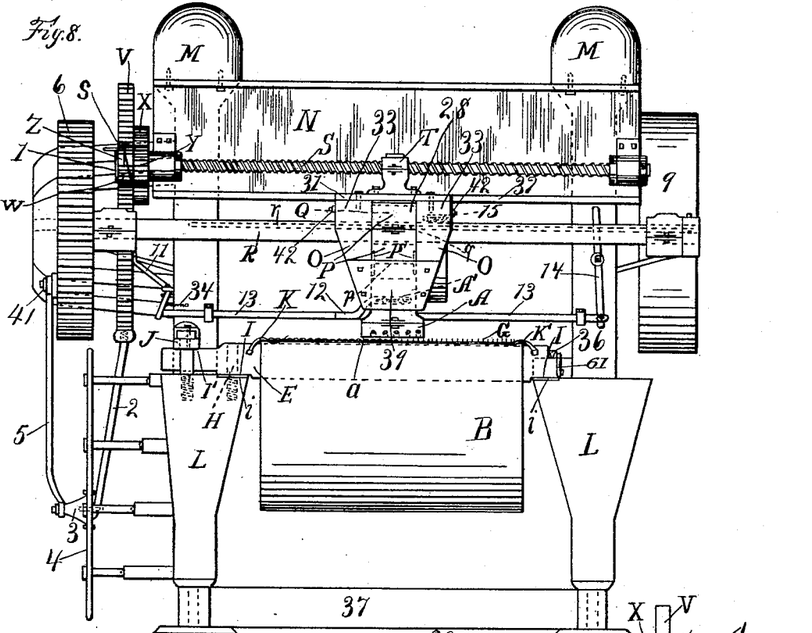
Fig. 8 is a front view of the machine in operation in riveting a section of pipe.
Figure 9:
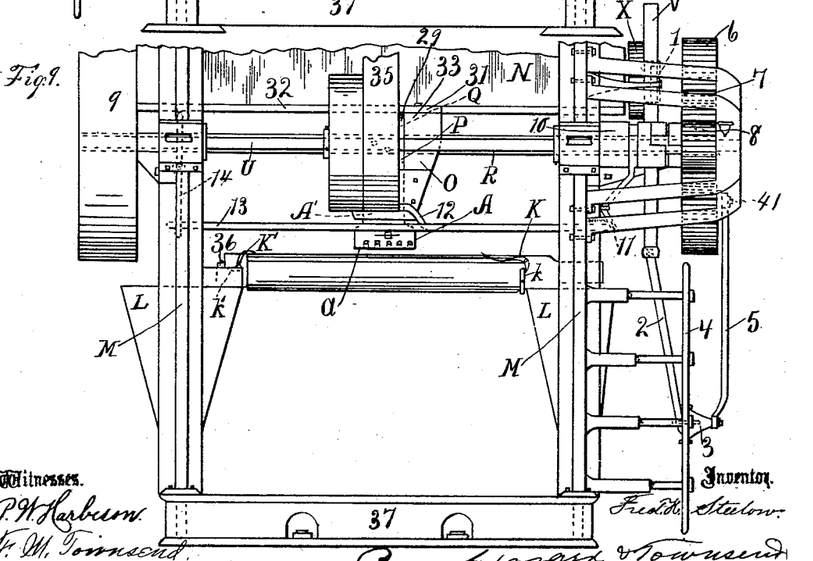
Fig. 9 is a rear view of the same without the pipe.

In practice the driving-shaft U is run at a high rate of speed. The pipe having been punched for rivets and the rivets inserted through the rivet-holes in the ordinary manner, the mandrel is swung out into the position shown in Fig. 7 and the pipe placed thereon with the rivet-bases set in the cavities e. The clamps or claws K K' are turned to hold the pipe on the mandrel, which is then swung into its closed position, as shown in Fig. 8. The clutch is then thrown into engagement and the mechanism operated to reciprocate the plunger and die-plate.

It will be observed from Fig. 10 that the eccentric Q, the feed and transmission mechanism X, Y, Z, S, and s, and the rack V and pitman 5 are so arranged with relation to each other that the screw-shaft is operated to advance the head only when the head is sufficiently elevated to clear the rivets.

35 represents the belt which transmits power to the machine.

37 represents a base upon which the standards are removably secured. The front of the base is open to give room for pipe of very large diameter.

38 38 represent dust-covers to shield the plunger-bearings from dust.

40 are set-screws to hold the dies in their seats.

The head-frame is provided with the removable front piece 39 to admit the plunger.

The extent of the revolution of the screw-shaft, and consequent advancement of the head between strokes of the plunger, is regulated by adjusting the pitman-fastening 41 at a greater or less distance from the center of the shaft R, so that the rotation of the shaft R will cause a greater or less length of stroke of the rack V, which drives the screw-shaft.

42, 43, and 44 are ties to brace and hold the parts together.

The rivets in different stages of the work are distinguished in Fig. 1 by different reference-letters. G indicates the rivets before they are acted upon; G', the stoved rivet; G'', the flattened rivet, and G''' the headed rivet.

Figure 13:
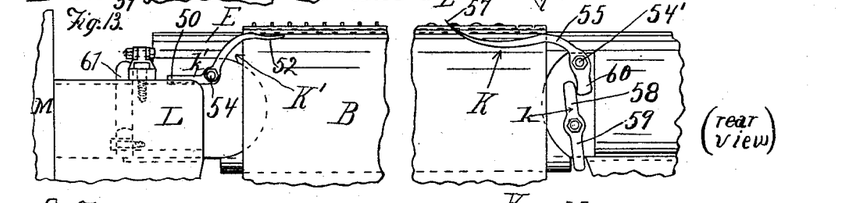
Fig. 13 is a reverse or rear view of the same.
Figure 14:
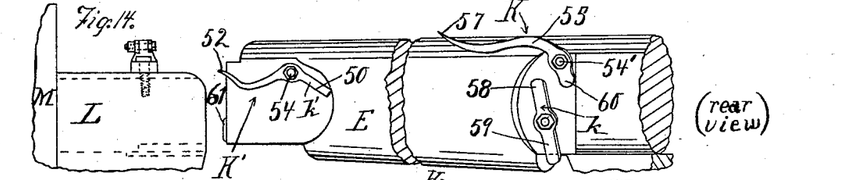
Fig. 14 is a fragmentary rear view showing the mandrel swung forward into the position shown in Fig. 7. In this view the clamp at the free end of the mandrel has been thrown open to admit the work. This view shows the position into which the clamp is thrown by the operation of removing the completed work from the mandrel.

In practice when the work is to be placed upon the mandrel the spring-clamp lever at the free end of the mandrel is thrown into the position shown in Fig. 14 and the tube, with rivets inserted, is placed upon the mandrel. Then the spring-lever is thrown back upon the work, as indicated in Figs. 12 and 13, thus bringing the frame-engaging end 50 of the clamp into position to strike upon the bevel portion of face 51 of the frame when the mandrel is thrown into place. This forces the spring ends or members 52 53 of the clamp down firmly upon the work. The two spring members 52 53 of the clamp are secured together and pivoted to the mandrel by the rod 54, which in practice is formed integral with the spring member 53 of the clamp and is passed through the mandrel and fixed to the member 50 52 of the clamp. The clamp at the pivot end of the mandrel consists of the two spring members 55 and 56, which are secured together and pivoted to the mandrel by a rod 54' in the same manner as the members of the clamp at the free end of the mandrel. Their free ends are curved upward, as indicated at 57, so that when the work is placed upon the mandrel it can be passed underneath the springs. The members 55 and 56 rest upon the mandrel when there is no work thereon, as is indicated in Fig. 14. An auxiliary lever having the arms 58 and 59 is pivoted to the mandrel and is arranged to engage the frame when the mandrel is closed and to be thereby operated to engage the protruding end 60 of the member 55 and throw such end 60 away from the work, thus forcing the spring portion of the clamp down upon the work.

Figures 15, 16:
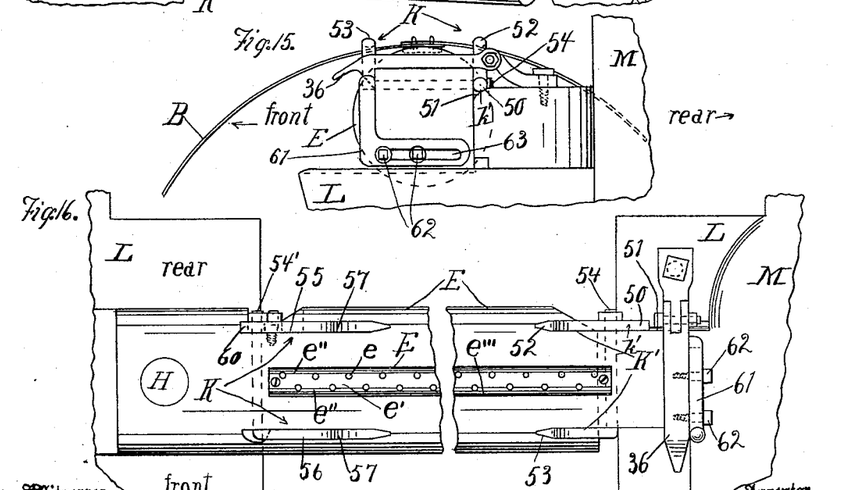
Fig. 15 is an elevation looking from the right side of the machine toward the end of the mandrel when the mandrel is in its closed position with work in place.
Fig. 16 is a fragmentary top view showing the mandrel closed without the work.

61 indicates a sliding handle, secured to the end of the mandrel by bolts 62, passing through a slot 63 in the handle to allow the handle to be drawn out from the mandrel, so that it may be grasped, and also to allow it to be retracted, as shown in Fig. 15, so that pipe of small diameter may be placed on the mandrel.

Now, having described my invention, what I claim as new, and desire to secure by Letters Patent, is—

1. In a riveting-machine, the combination of a riveting-die plate provided with a series of rivet-setting dies consisting of a centering and stoving die, a spreading-die, and a heading-die arranged in the order named, and means for causing the several dies to operate successively upon a series of rivets to stove, flatten, and head them in turn, as set forth.

2. The combination, in a riveting-machine, of the mandrel proper provided with an interchangeable plate, such plate being shaped (the entire length of the seam) to the interior curvature of the tube to be riveted and having the rivet-base-seating cavities, die-plate-operating mechanism, and an interchangeable die-plate having its pressure-face shaped to the exterior diameter of the tube to be riveted, and having a series of dies, each of which is provided with a cavity large enough to chamber the rivet acted upon, whereby the die-plate is adapted to press the laps as well as the rivets and cause every part of the seam to be firmly closed and shaped to the curvature of the tube while being riveted.

3. In a riveting-machine, the combination of the mandrel provided with the rivet-base-seating cavities, die-plate-operating mechanism, and a die-plate provided with a series of five rivet-setting dies arranged in line, the middle one of which is a heading-die, the next one on each side thereof a spreading-die, and those at the ends of the line stoving-dies, each provided with a cavity large enough to completely chamber the rivet each die has acted upon, and each cavity being large enough to chamber the head of the completed rivet, whereby the die-plate is adapted to operate in either direction and to press the sheets together each time a rivet is acted upon.

4. In a riveting-machine, a rivet-setting die-plate provided with the two series of five rivet-setting dies arranged in two parallel lines and in alternating positions, each series comprising the central heading-die, the two intermediate spreading-dies, and the two end centering and stoving dies, each die being provided with a cavity large enough to chamber the rivet such die has acted upon.

5. In a riveting-machine, the combination set forth of a mandrel provided with two rows of rivet-base-seating cavities and having its pressure-face curved to conform to the curvature of the interior of the tube to be riveted and the reciprocating die-plate provided with the rivet-chambering cavities and having its pressure-face curved to conform to the exterior of such tube.

6. In a riveting-machine, the combination set forth of a mandrel provided with two rows of rivet-base-seating cavities and having its pressure-face curved to conform to the curvature of the interior of the tube to be riveted and provided between the center lines of such rows of cavities with a pressure-relieving space, and the reciprocating die-plate provided with the rivet-chambering cavities and having its pressure-face curved to conform to the exterior of the pipe to be riveted.

7. In a riveting-machine, the combination of the frame of the machine, the swinging mandrel, and the spring-clamps arranged on such mandrel and provided with levers arranged to engage the frame of the machine when the mandrel is swung inward and be thereby caused to press the spring-clamps down toward the mandrel.

8. The combination set forth of the frame of the machine, the riveting-head slide-beam secured thereto, the head-frame movably mounted on such beam, the rotating eccentric-driving shaft journaled to the frame of the machine, the eccentric-box in the head-frame, the eccentric journaled in the eccentric-box and mounted to slide on such shaft and rotate therewith, and the thrust-blocks fitted to the under face of the beam to slide therealong and journaled upon the eccentric-driving shaft, the plunger connected with the eccentric-box, the die-plate secured to the plunger, and the mandrel secured to the frame of the machine below the plunger.

9. The combination set forth of the frame of the machine, the riveting-head slide-beam secured thereto, the head-frame movably mounted on such beam, the rotating eccentric-driving shaft journaled to the frame of the machine, the eccentric-box in the head-frame, the eccentric journaled in the eccentric-box and mounted to slide on such shaft and rotate therewith, the thrust-blocks fitted to the under face of the beam to slide therealong and journaled upon the eccentric-driving shaft, the plunger connected with the eccentric-box, the die-plate secured to the plunger, the mandrel secured to the frame of the machine below the plunger, the screw-shaft secured to the head slide-beam, the female-screw traveler connecting the head-frame with the screw-shaft, and intermediate transmitting mechanism connecting the screw-shaft and eccentric-driving shaft to cause them to rotate with relation to each other, substantially as set forth.

10. The combination set forth of the frame of the machine, the riveting-head slide-beam secured thereto, the head-frame movably mounted on such beam, the rotating eccentric-driving shaft journaled to the frame of the machine, the eccentric-box in the head-frame, the eccentric journaled in the eccentric-box and mounted to slide on such shaft and rotate therewith, the thrust-blocks fitted to the under face of the beam to slide therealong and journaled upon the eccentric-driving shaft, the plunger connected with the eccentric-box, the die-plate secured to the plunger, the mandrel secured to the frame of the machine below the plunger, intermediate transmitting mechanism connecting the screw-shaft and eccentric-driving shaft to cause them to rotate with relation to each other, substantially as set forth, the reversible pawl-feed mechanism secured to the screw-shaft, the train of cogs Z, Y, X, and W, connecting the screw-shaft with the reciprocating-rack, the reciprocating rack arranged to drive such train, and means connecting the driving-shaft and the rack to cause the rotary motion of the shaft to reciprocate the rack.

11. In a machine of the class described, the combination of the eccentric-driving shaft, the eccentric, the die-plate, plunger, and eccentric-box actuated by the eccentric, the head slide-beam, and the thrust-blocks journaled upon the driving-shaft and fitted to the under face of the beam to slide therealong and support the shaft against the thrust of the eccentric.

12. The combination of the eccentric-driving shaft provided with the channel, the eccentric mounted on such shaft and arranged to slide therealong and provided with the spline projecting into such channel, the plunger provided with the die-plate, the eccentric-box journaled upon the eccentric and connected with the plunger, means to guide the plunger, and means for moving the eccentric and the box and plunger along such shaft.

13. The combination of the frame provided with the bevel-face 51, the mandrel pivoted to such frame, and the clamp pivoted to the free end of such mandrel and comprising the spring member 53 and the spring member 52, having the engaging end 50 arranged to strike upon the bevel-face 51 when the mandrel is thrown into place, said spring members being secured together and pivoted to the mandrel and arranged to clamp the work in place when the mandrel is closed.

14. The combination of the frame, the mandrel pivoted to such frame, a spring-arm pivoted to such mandrel at the pivot end thereof and arranged to rest upon the work when in place and provided with the protruding end 60, and the auxiliary lever pivoted to the mandrel and having the arms 58 and 59 and arranged to engage the frame and to be thereby operated to engage the protruding end of the spring member to force the spring portion of the clamp down upon the work.

FRED. H. STEELOW.

Witnesses:
JAMES R. TOWNSEND,
ALFRED I. TOWNSEND.